United States Patent [19]

Hirohata et al.

[11] 4,396,267
[45] Aug. 2, 1983

[54] ELECTROMAGNETIC DRIVING DEVICE FOR A CAMERA

[75] Inventors: Michio Hirohata, Inagi; Hideo Ikari, Tokyo, both of Japan

[73] Assignee: Canon Kabushiki Kaisha, Tokyo, Japan

[21] Appl. No.: 333,418

[22] Filed: Dec. 22, 1981

[30] Foreign Application Priority Data

Dec. 29, 1980 [JP] Japan ............................ 55-189662[U]
Jan. 13, 1981 [JP] Japan .................................... 56-3641

[51] Int. Cl.³ ............................................... G03B 3/10
[52] U.S. Cl. ..................................... 354/195; 354/25; 354/230; 354/234
[58] Field of Search ................. 354/25, 195, 196, 234, 354/230

[56] References Cited

U.S. PATENT DOCUMENTS 4,348,094 9/1982 Hirohata et al. .................... 354/234

Primary Examiner—John Gonzales
Attorney, Agent, or Firm—Toren, McGeady and Stanger

[57] ABSTRACT

An electromagnetic driving device for a camera having a first state for performing a focus adjusting operation of the objective lens by detecting the object distance which is followed after the termination of this focus adjusting operation, by a second state for initiating an exposure operation. A driven member is movable from an initial position in either 1st or 2nd direction by controlling the direction of current flow to a coil positioned in a magnetic field of permanent magnets. Movement of this driven member in the 1st direction controls the focus adjusting operation, and movement in the 2nd direction controls the exposure operation.

8 Claims, 2 Drawing Figures

ELECTROMAGNETIC DRIVING DEVICE FOR A CAMERA

BACKGROUND OF THE INVENTION

1. Field of the Invention

This invention relates to electromagnetic driving devices for cameras in which the direction of movement of a driven member is reversed by changing the direction of current flow to a coil arranged in the magnetic field, and more particularly to electromagnetic driving devices for cameras in which the focus adjusting operation and the exposure operation are controlled by selectively utilizing the directions of movement of the aforesaid driven member.

2. Description of the Prior Art

In the past, the camera having the automatic focus adjusting mechanism (hereinafter described as AF mechanism) with the automatic exposure control in accordance with the object brightness was necessarily provided with a 1st electromagnet for controlling the initiation and termination of an operation of the AF mechanism and a 2nd electromagnet for controlling the opening and closing operation of the shutter blades. This constituted a drawback that the internal structure of the camera became complicated and it was disadvantageous from the cost standpoint. Therefore, of recent years, it is strongly desired to make such camera operation controllable by using one electromagnet.

On the other hand, it is known in the art to provide a camera using one electromagnet in combination with a coordinating system for the AF mechanism and the shutter, as, for example, disclosed in Japanese Laid-Open Patent Application No. Sho 54-71633 (U.S. Pat. No. 4,209,242). This camera has to actuate and release the AF mechanism and the shutter in such a manner that an energization of the electromagnet stops the AF mechanism, and the subsequent deenergization of the electromagnet closes the shutter blades, while the start of movement of the AF mechanism and the opening of the shutter are carried out by a moving member which starts to run from the latched position when a camera release is actuated. With such coordinating system, however, the moving member after having been taken out of the latching connection in response to actuation of a camera release is allowed to govern its movement all the way in no relation to the operation of the electromagnet with the result that the operation of the AF mechanism is initiated and the shutter blades are opened. Therefore, there has been a high possibility of occurrence of a faulty operation, for example, a premature opening of the shutter blades before the termination of the focus adjusting operation, and it has been difficult to expect an accurate and reliable control. Also, since, in such camera, the actuation of camera release is followed after a predetermined time, this is, soon after the termination of the focus adjusting operation, by the opening of the shutter, a self-timer shot is impossible. This has been disadvantageous for the broadening of shooting capabilities of the camera is limited.

Also, the use of such mechanical linkage between the actuator for the AF mechanism and the actuator for the camera release gives rise to another problem that as the release button is pushed down very fast, the electrical preparation for the AF mechanism cannot catch up with the start of movement of the AF mechanism. To solve this, it is unavoidable to increase the complexity of structure.

SUMMARY OF THE INVENTION

With the foregoing in mind, it is an object of the present invention to provide an electromagnetic driving device for a camera utilizing the fact that the electromagnetic driving force on a coil arranged in the magnetic field is exerted in different directions depending upon the direction of current flow through the coil, wherein when said electromagnetic driving force acts on a driven member to move in a 1st direction, an initiation and a termination of a focus detecting operation, and when to move in a 2nd direction, an opening and a closing of the shutter blades, are controlled, thereby it is made possible to take a simple form of structure, while still permitting the focus adjusting operating and the exposure operation to be controlled exceedingly accurately and reliably.

Another object of the present invention is to provide an electromagnetic driving device for a camera using one electromagnetic drive means arranged so that the focus adjusting operation and the exposure operation can be controlled entirely independently of each other, thus achieving the possibility of self-timer shots.

These and other objects of the present invention will become apparent from the following detailed description of an embodiment thereof.

DETAILED DESCRIPTION OF THE PREFERRED EMBODIMENT

Figure 1:
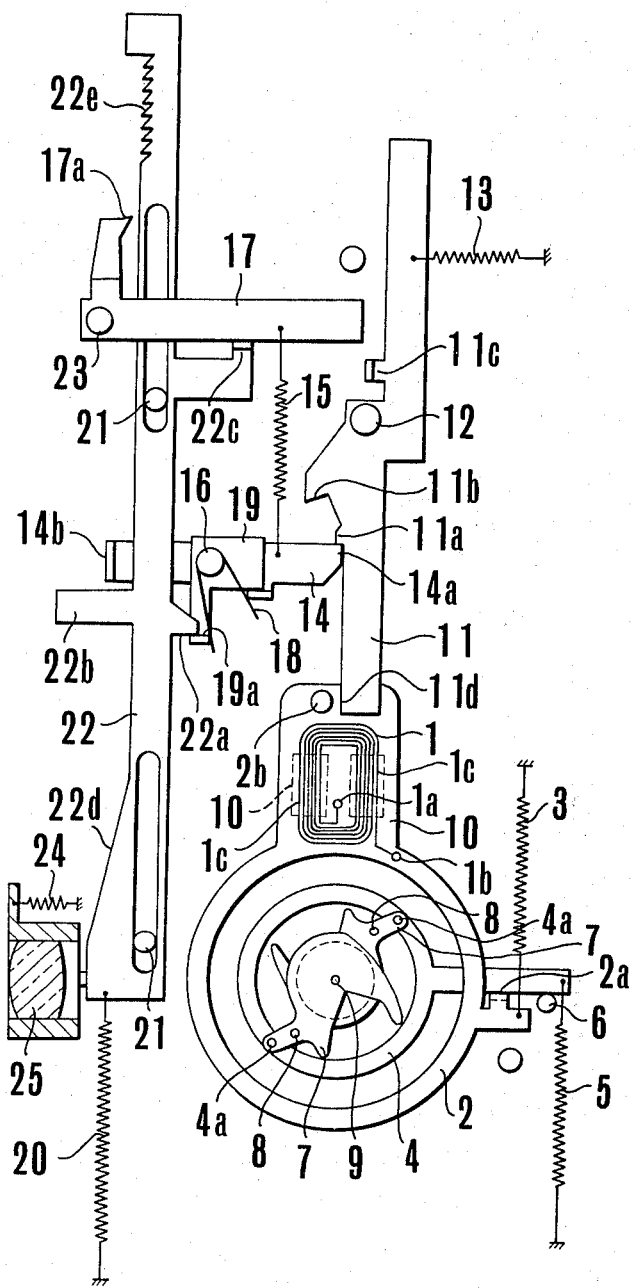
FIG. 1 is an elevational view of an embodiment of an electromagnetic driving device for a camera according to the present invention.
Figure 2:
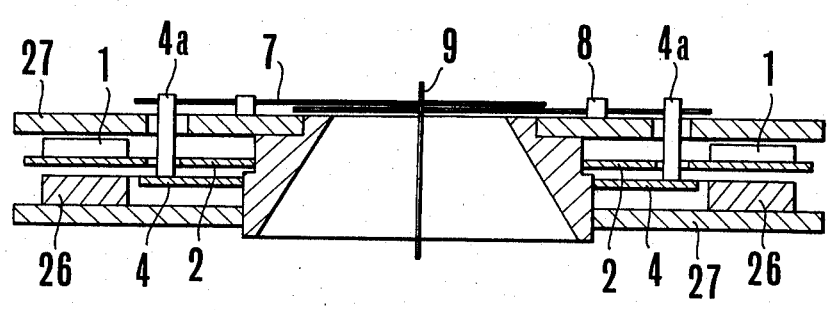
FIG. 2 is a sectional view of the FIG. 1 embodiment.

The present invention will next be described in greater detail in connection with an embodiment thereof by reference to the drawings. In FIGS. 1 and 2, 1 is a coil for exerting an electromagnetic driving force fixedly mounted on a rotor 2 and of which both ends 1a and 1b are connected to a control circuit (not shown). A spring 3 urges the rotor 2 in a counterclockwise direction, but since a shutter closing spring 5 connected to a sector ring 4 for clockwise movement is stronger, in the illustrated position, as the sector ring 4 rests on a stopper 6 under the action of the shutter closing spring 5, the rotor 2 is held stationary by a radially outwardly extending projection 2a abutting on the side of a radial arm of the sector ring 4.

Also fixedly mounted on the sector ring 4 are a pair of sector pins 4a on which respective shutter blades 7 are rotatably fitted, so that when the sector ring 4 turns in the counterclockwise direction, an exposure aperture is opened. That is, the shutter blades 7 are supported to be pivotal about shafts 8 fixedly mounted to a camera housing (not shown) so that movement of the sector pins 4a related to rotation of the sector ring 4 opens the shutter.

It is noted that the coil 1 is configured to a rectangular shape with two radial components 1c relative to an optical axis 9 arranged to lie in respective magnetic fields 10 formed by two permanent magnet pieces 26 and a yoke 27 as illustrated in FIG. 2. The directions of these two magnetic fields 10 are opposed to each other, as the current flowing from an inside inlet 1a to an outside outlet of the coil 1 takes opposite directions in the right and left radial components 1c, for the electromagnetic forces exerted on the two radial components 1c of the coil 1 act on the rotor 2 in the same direction.

A latch lever 11 is pivotally mounted at a pin 12 and is urged by a spring 13 in a clockwise direction. This latch lever 11 is provided with a 1st pawl 11a for latching an AF start lever 14 at its one arm end 14a in an initial position, a 2nd pawl 11b for arresting the turning AF start lever 11 about a pivot pin 16 under the action of a spring after the AF start lever 14 has been released from the connection with the 1st pawl 11a, an abutment or extension 11c for an AF stop pawl lever 17 at its tail, and a rotor sensor 11d extending into the path of movement of an actuator pin 2b for the latch lever 11 on the rotor 2. Pivotally mounted on the common pin 16 of the AF start lever 14 is a start pawl lever 19 resting in the illustrated position by a return spring 18, where an extension 19a bears a downwardly urged set plate 22 at its arm 22a, thereby said set plate 22 is set ready to move downwards. A spring 20 urges the set plate 22 in a downward direction. 21 is a pair of guide pins penetrating respective elongated slots in the set plate 22.

Whilst the parts mentioned above contribute to hold the main control driving member or set plate 22 of the AF mechanism in the initial position, a mechanism for driving this to carry out an AF control and after that returning the AF mechanism to the initial position is constructed as follows: The set plate 22 is provided with a charging arm 22b receptive of an upward force from an AF charge mechanism (not shown) drivingly connected to an electric motor (not shown). As this charging arm 22b is actuated by the AF charge mechanism, the spring 20 is over-charged. Then, as the AF charge mechanism retracts from the engagement with the arm 22b, the set plate 22 is slightly moved backward to the initial position illustrated in FIG. 1. Such upward movement of the charging arm 22b also causes the AF start lever 14 to turn about the pin 16 in engagement with the tail 14b against the force of a spring 15, thereby the pawl 14a is taken out of the engagement with the 2nd latch pawl 11b of the lever 11 and is brought into engagement with the 1st latch pawl 11a. The back side of the start latching arm 22a is formed to a slant camming surface so that when the set plate 22 is moved upward to the charged position, the start pawl lever 19 is caused to escape against the force of the spring 18. Thus, the set plate 22 is enable to regain the initial setting state. The set plate 22 is further provided with a holder 22c to sustain the AF stop lever 17 in the initial setting position as the AF stop pawl level 17 is urged by the spring 15 to turn about a pivot pin 23 in a clockwise direction. The AF stop pawl lever 17 operates in such a manner that when the actuator pin 2b on the rotor 2 turns the latch lever 11 in the counterclockwise direction which in turn causes the AF start lever 14 to turn in the counterclockwise direction, the set plate 22 starts to move downwards along with the holder 22c which the AF stop pawl lever 17 follows up until its tail engages with the abutment 11c at which the AF stop pawl lever 17 is prohibited from further pivotal movement.

A photographic objective lens 25 is urged by a spring 24 toward a lens cam 22d formed in the set plate 22 and is made movable as the set plate 22 moves. It is to be noted in connection with the movement of the set plate 22 that when the objective lens 25 reaches a certain position determined by a focus detecting device (not shown), the current supply to the coil 1 is cut off, permitting the latch lever 11 to return under the action of the spring 13, thereby the abutment 11c is moved away from the tail of the AF stop pawl lever 17. Then, the pawl 17a jumps into a ratchet-toothed portion 22e formed in the side edge of the set plate 22, engaging with one of the teeth thereof, thus the set plate 22 is arrested in the corresponding position.

It is also noted that, as FIG. 2 in the sectional view illustrates part of the sector ring 4 of this embodiment, the space surrounded by the optical axis 9 and the magnet pieces 26 contains the shutter blades 7 and the sector ring 4 so as to sandwich the rotor 2. It is, therefore, to be understood that the space which could not be utilized in the conventional device can be effectively used to maintain the compact thin form, while nevertheless the sector ring 4 and the rotor 2 are constructed in the separate form from each other.

The operation is as follows:

Resetting of the set plate 22 to the charged position has been carried out in the sequence after the exposure by utilizing the winding motor (not shown). With the set plate 22 in the initial set position of FIG. 1, then when a release button on the camera housing is depressed, a control circuit (not shown) and a focus detecting device (not shown) are rendered operative to measure the object distance. After that, the control circuit feeds current to the coil 1 as flowing from the inside inlet 1a to the outside outlet 1b, thereby an electromagnetic driving force is produced as has been mentioned above. Then, the rotor 2 is driven to turn in the clockwise direction while charging the spring 3, and the actuator pin 2b strikes the latch lever 11 at the tail lid.

Therefore, the latch lever 11 is turned in the counterclockwise direction, thereby the pawl 14a of the AF start lever 14 is disengaged from the start latch portion 11a. As the latch lever 11 turns, the stop pawl latch portion 11c is shifted leftward to a position just beneath the tail of the AF stop pawl lever 17. Also as the AF start lever 14 turns along with the start pawl lever 19 in the counterclockwise direction, the set plate latch portion 19a is moved away from the start latch portion 22a of the set plate 22. Then the set plate 22 starts to move downwards under the action of the spring 20. It is noted here that such downward movement of the set plate 22 is followed up by clockwise movement of the AF stop pawl lever 17, but this clockwise movement is limited to a certain small range by the stop pawl latch portion 11c so that its pawl 17a does not engage the ratchet-toothed portion 22e. Then, the set plate 22 continues moving downwards, causing the lens cam 22d of the said set plate 22 to move the objective lens 25 axially. When the objective lens 25 has reached a proper position sensed by the aforesaid focus detecting device, the control circuit no longer feeds current to the coil 1. As a result, the rotor 2 loses the driving force and turns backwards or in the counterclockwise direction under the action of the spring 3. The latch lever 11 too is turned in the clockwise direction under the action of the spring 13. Such movement of the latch lever 11 causes the stop pawl latch portion 11c to move to the right away from the AF stop pawl lever tail 17. Therefore, the AF stop pawl lever 17 is released to move in the clockwise direction by the spring 15. Then, the pawl 17a jumps in the toothed portion 22e of the set plate, thereby the set plate 22 gets stopped from further downward movement. Thus, the position of the objective lens 25 is adjusted to sharp focus setting.

After the termination of the focus adjusting operation, the control circuit feeds current to the coil 1 again but from the outside end 1b to the inside end 1a, thereby the rotor 2 is driven by the electromagnetic force to turn in the counterclockwise direction against the spring 5, while opening the shutter blades 7. When a predetermined amount of exposure is obtained, the control circuit cuts off current supply to the coil 1. Then, the shutter blades 7 return to the initial position, thus terminating the exposure. It is noted that the circuit for controlling the exposure in accordance with the object brightness is known in the art, and, therefore, an explanation about its operation is omitted here.

The termination of the exposure operation is followed by a charging operation of the set plate 22 by the winding motor (not shown) as has been mentioned above. That is, as the set plate 22 is charged to the upward direction, returning to the initial set position, the objective lens 25 is pushed forwards by the lens cam 22d to the set position, the AF start lever 14 is pushed at the tail 14b upwards to the set position, and further AF stop pawl lever 17 is pushed by the holder 22c upwards to the set position. Thus, all the portions of the device regain their initial set positions illustrated in FIG. 1.

In the above-described embodiment, the sector ring 4 lies in the space surrounded by the rotor 2, permanent magnets 26 and optical axis 9, thereby giving an advantage that the spare space inside the permanent magnets is effectively utilized. Also the above embodiment has been described in connection with the moving coil type, but the present invention is applicable to the moving magnet type. In this case, it is preferred to arrange the sector ring in the space surrounded by the optical axis, coil and rotor.

As has been described in greater detail, the present invention is to arrange a coil in magnetic fields so that an electromagnetic force exerted therein acts in a different direction depending upon the direction of current flow and to apply this electromagnetic force to move a driven member either in a 1st direction, whereby a focus adjusting operation is controlled, or in a 2nd direction whereby an exposure operation is controlled, with an advantage that while being of very simple structure, a very high accuracy and reliability of focus adjusting and exposure controls can be realized. In other words, according to the present invention, a focus adjusting operation is initiated by an early-stage current supply to the coil in response to actuation of a camera release, and the focus adjusting operation is terminated by cutting off that current supply, and further it is by the next-stage current supply of different direction to that of the aforesaid early stage current supply to the coil that opening of the shutter is performed, and by cutting off that current supply that closing of the shutter is performed. This enables the system for converting the various control signals to the mechanical actuations to be constructed in a very simple form, and, as the necessary number of parts is reduced, a cost down of the device can be achieved. Also, according to the present invention, the focus adjusting operation and the exposure operation can be performed entirely independently of each other, thereby it being made possible to provide for use of the self-timer function in the camera easily.

Further, the present invention is to construct the driven member on which the electromagnetic driving force acts and the member which is operatively connected to the shutter blades in separate form from each other, so that there is no possibility of the preliminary current supply actuating the shutter blades, thereby giving an additional advantage that the electromagnetic driving device is suited for use with a large relative aperture shutter having a large stroke of the blades with a relatively small amount of overlap of the blades.

What is claimed is:

1. An electromagnetic driving device for a camera in which focus adjusting operation of an objective lens is performed and, after the termination of this focus adjusting operation, an exposure operation is initiated, comprising:
    (a) a coil, said coil being positioned in magnetic fields and producing an electromagnetic driving force in a different direction depending upon the direction of current flow;
    (b) a driven member, said driven member responsive to the aforesaid electromagnetic driving force moving from an initial position to either one of 1st and 2nd direction;
    (c) focus adjusting means, the operation of said means being started by rendering said driven member to move in the 1st direction; and
    (d) exposure means, the operation of said means being started by rendering said driven member to move in the 2nd direction.

2. A device according to claim 1, wherein said driven member when moving to the 1st direction initiates the focus adjusting operation, when returning to the initial position, terminates the focus adjusting operation, when moving to the 2nd direction, initiates the exposure operation, and when returning to the initial position, terminates the exposure operation.

3. A device according to claim 2, wherein said driven member is supported to be rotatable about a lens axis.

4. An electromagnetic driving device for a camera which is made to perform a focus adjusting operation of an objective lens by sensing a distance from the camera to an object to be photographed, and, after the termination of this focus adjusting operation, to initiate an exposure operation, including:
    (a) a coil, said coil being positioned in magnetic fields and producing an electromagnetic driving force in a different direction depending upon the direction of current flow;
    (b) a driven member, said driven member responsive to the aforesaid electromagnetic driving force being turned about a lens axis from an initial position to either one of 1st and 2nd directions;
    (c) a latch control member, said latch control member responsive to rotative movement of said driven member to the 1st direction starting the focus adjusting operation; and
    (d) a sector ring, said sector ring turning about the lens axis and responsive to rotative movement of said driven member to the 2nd direction controlling the exposure operation.

5. A device according to claim 4, further including:
    (a) blade members, said blade members being operatively connected to said sector ring;
    (b) 1st bias means, said means urging said blade members in a direction to close; and
    (c) 2nd bias means, said means urging said blade members in a direction to open and its bias force being set smaller than that of said 1st bias means.

6. A device according to claim 5, wherein said 1st bias means acts on said sector ring, and said 2nd bias means acts on said driven member.

7. A device according to claim 4, further including:

(a) a moving member, whereby when said moving member moves, the focus adjusting operation is performed;
(b) a 1st latch member, said 1st latch member when released from engagement with said latch control member initiating a movement of said moving member; and
(c) a 2nd latch member, said 2nd latch member when released from engagement with said latch control member terminating the movement of said moving member.

8. A device according to claim 7, wherein said 2nd latch member is caused to engage said latch control member by the initiation of movement of said moving member.

* * * * *